United States Patent
Schreiber (10) Patent No.: US 6,739,458 B2
(45) Date of Patent: May 25, 2004

(54) DEVICE FOR DEHYDRATING SLUDGE (75) Inventor: Thomas Schreiber, Freystadt (DE)

(73) Assignee: Hans Huber AG, Berching (DE)

( * ) Notice: Subject to any disclaimer, the term of this patent is extended or adjusted under 35 U.S.C. 154(b) by 94 days.

(21) Appl. No.: 10/047,413

(22) Filed: Jan. 15, 2002

(65) Prior Publication Data

US 2002/0060181 A1 May 23, 2002

Related U.S. Application Data (63) Continuation of application No. PCT/EP00/06747, filed on Jul. 14, 2000.

(30) Foreign Application Priority Data

Jul. 15, 1999 (DE) .......................... 199 32 416

(51) Int. Cl.$^7$ .......................... B01D 33/64; C02F 11/12
(52) U.S. Cl. .................. 210/386; 210/393; 210/396; 210/397
(58) Field of Search ................. 210/386, 391, 210/393, 396, 397, 407, 408, 409, 413, 414

(56) References Cited

U.S. PATENT DOCUMENTS

| | | | | |
|---|---|---|---|---|
| 1,653,473 A | * | 12/1927 | Schulz ................. | 210/130 |
| 2,424,932 A | * | 7/1947 | Juhasz ................. | 210/407 |
| 2,802,572 A | | 8/1957 | Jalkanen | |
| 2,833,417 A | * | 5/1958 | Umbricht et al. ........ | 210/342 |
| 4,514,300 A | * | 4/1985 | Szczesny et al. ........ | 210/342 |
| 5,722,264 A | * | 3/1998 | Antkowiak ............. | 68/43 |
| 5,904,843 A | * | 5/1999 | Herbst ................ | 210/170 |

FOREIGN PATENT DOCUMENTS

| | | |
|---|---|---|
| BE | 564675 | 7/1960 |
| DE | 2747506 A1 | 4/1979 |
| DE | 3942561 C1 | 1/1991 |
| DE | 3941916 * | 6/1991 |
| EP | 0425757 A1 | 5/1991 |
| EP | 0615957 A1 | 9/1994 |
| FR | 2729383 | 7/1996 |

OTHER PUBLICATIONS

EPO, International Search Report, PCT/EP00/06747, pp. 1–2, Oct. 12, 2000, The Netherlands.
PCT, International Preliminary Examination Report, PCT/EP00/06747, pp. 1–5, (Translation), Oct. 26, 2001, The Netherlands.

* cited by examiner

Primary Examiner—Fred G. Prince
(74) Attorney, Agent, or Firm—Dority & Manning (57) ABSTRACT The invention is relative to a device for dehydrating sludge such as occurs in sewage treatment plants in the form of dilute sludge. The receptacle for the sludge contains a sieve surface comprising openings for the passage of liquid. The sieve surface, for its part, is substantially circular can be rotated about an axis (21) running vertically to the sieve surface. The axis (21) of the sieve surface (2) is inclined relative to a horizontal line and is caused to rotate by a drive device (3). The disk-shaped sieve surface (2) is arranged in a container (11) comprising a bottom (13) and a side wall (12) through which side wall a supply line (4) for the sludge and an outlet (41) for the separated water run.

29 Claims, 6 Drawing Sheets

DEVICE FOR DEHYDRATING SLUDGE

The present application is a Continuation Application under 35 U.S.C.§ 120 of PCT/EP00/06747, filed Jul. 14, 2000, which claims priority to German Application No. 199 32 416.6, filed Jul. 15, 1999.

The present invention is relative to a device for dehydrating sludge, especially dilute sludges, in accordance with the generic part of claim 1.

Various sludges such as recycled sludge, digesting sludge or fresh sludge, etc. accumulate in the preparation of waste water, especially in sewage treatment plants. These sludges have at times a very high water content that should be reduced. The reducing of the water content simplifies in particular the managing of the sludge as well as, for example, significantly reduces the disposal costs. In particular, mechanical systems are also used for the concentrating of sludges. Usually a conditioning of the sludge with polyelectrolytes (auxiliary flocculation agents) are employed for a mechanical concentrating of sludges. These polyelectrolytes bring about a flocculation of the sludges treated in this manner so that the separation and filtration of the free supernatant water is better possible. As a rule, a volumetric decrease of approximately 80%–90% is possible with mechanical systems in combination with the conditioning of the sludge. In particular, this also makes it possible to render subsequent method steps in the purification of waste water more economical and more effective.

DE 39 42 561 C1 teaches a device that operates continuously and automatically to dehydrate a sludge laced with an auxiliary flocculation agent (e.g., polyelectrolyte). In this system, that operates with a transport worm, conditioned sludge is conducted into a cylindrical wedge-wire screen and transported there by the transport worm continuously from the inlet of the screen cylinder to the discharge of the screen cylinder. The device is set up at an angle of approximately 30° between the inlet and the discharge, as a result of which the flocculated sludge is continuously raised with the transport worm. In addition to the transport, a rotation of the flocculated sludge also takes place, which amplifies the exit of the filtrate water through the wedge-wire screen. The entrained solids remain in the cylinder and are separated at its end via a chute. The filtration time is regulated via the transport speed of the worm.

Usually, a conditioning of the sludge is also carried out in centrifugal systems for separating water from sludges. The work is performed at high rotation speeds in these systems, as a result of which solids settle on the sieve jacket of the centrifuge. The separated water collects in the center of the sieve jacket and flows via an outlet tube out of the jacket. The solid is transported by the centrifuge rotor via a control dam out of the jacket. In addition, devices with rotating sieve drums are also known. The flocculated sludge is centrally introduced into a sieve drum, during which a rotation of the flocculated sludge takes place by means of the rotation of the sieve drum in combination with so-called transport baffles. The supernatant water passes through the sieve surface of the drum to the outside, during which the solid is concentrated in the drum. The solid is ejected by the rotation of the drum through the mounted baffles, that generate a thrust, at the other end of the drum. These sieve drums are mounted at various inclinations between 0° and 10° of their axis.

Furthermore, band filter systems are known that are also designated as band thickeners or straining bands. They also work with sludge conditioned with polyelectrolytes. The flocculated sludge is placed and distributed on a polyester band cloth. The supernatant water flows through the sieve band by gravitation, during which the solid is deposited on its surface. A concentration of the sludge takes place by the advance of the filter cloth over rollers and, e.g., by means of other mounted components such as, e.g., baffles. The sludge moves along the thickening stretch by virtue of the advance of the band-shaped filter cloth and is dumped into a funnel after it has been concentrated.

The known devices have the disadvantage that they are expensive to construct and have a large space requirement.

DE-A 27 47 506 teaches a method of drying pasty, aqueous sludges in which the sludge is spread out on a horizontally aligned sieve surface and brought in contact with warm waste gases. The sludge is treated during the rotation of the sieve surface with various tools that engage into the sludge surface.

BE-A 564 675 teaches a device for dehydrating sludge in which the sludge is placed on rectangular sieve surfaces arranged in a box that are put in motion by vibrations. The box can be put in an inclined position by supports of varying heights.

The present invention has the problem of designing a device for dehydrating sludge, especially, dilute sludges, in such a manner that a device is created that saves space and is simply designed and assures a good separation between liquids and solids, in particular in the case of conditioned sludges. The invention solves this problem with the features of the device in accordance with claim 1.

The design of the device for dehydrating sludge in accordance with the invention brings it about in an advantageous manner that it can be compactly and economically constructed. The circular design of the sieve surface makes possible an advantageous utilization of the surface and therewith a low space requirement and at the same time a low expenditure for material. The rotatable design makes it possible to transport the sludge to be dehydrated in the device with only one moved part and at the same time to remove the dehydrated sludge out of the device. In addition, this embodiment simultaneously permits other components that cooperate with the device to be designed in an especially short and space-saving manner.

The design of the sieve surface with its axis inclined relative to a horizontal line brings it about that even water or liquids in general that settled on the surface of the sludge can be separated from the sludge. They flow off as a function of the slope. In an advantageous further development of the invention the device comprises a drive device, as a result of which the rotating of the sieve surface and therewith a transport of the dehydrated sludge is possible in an especially simple manner. It is advantageous if the sieve surface is supported by a shaft arranged vertically to the sieve surface. It is especially favorable if this shaft is arranged in the center of the circular sieve surface. Moreover, this shaft has the advantage that the sieve surface can also be caused to rotate, that is, is driven by the shaft. In another advantageous embodiment of the invention the sieve surface is supported in a rotatable fashion by its edge, e.g., on guides of the housing and can advantageously also be driven by its edge, that is, put in rotation.

The device advantageously comprises a supply line for sludge and also an outlet for separated water. It is likewise especially advantageous to provide a discharge for the dehydrated sludge. This makes it possible for the device to be able to operate continuously. In addition, this also makes it possible that the device can be used in an automatic system. The supply line for the sludge is advantageously arranged above the sieve surface thereby and the outlet for the separated water is arranged below the sieve surface, as a consequence of which natural gravity is utilized for dehydrating the sludge. The arrangement of supply and outlet distributed over the circumference brings it about that a reliable separation between water and solids can take place. To this end the container, in which the sieve surface is advantageously arranged, comprises a perforation. In an advantageous further development of the invention the container comprises a cover, as a result of which the sludge can be treated separated from its environment. This is especially advantageous when the device is used in closed spaces since sludges can also entrain components that are dangerous to health.

In an especially advantageous further development of the invention the drive device is mounted above the cover, which makes a simple and economical design of the device possible. The pivotable design of the container relative to a horizontal line can achieve an inclination of the sieve surface with the advantages associated therewith and at the same time the container can be emptied of water over only one side in which the separated water then collects. In an advantageous further development of the invention the container comprises supports for this purpose that carry the entire device. A changing of these supports makes it possible to adjust the inclination of the axis. In an advantageous embodiment the adjustability is designed in such a manner that inclinations of the sieve surface axis between 0° and 30° are made possible. In an advantageous further development of the invention the sieve surface consists of a carrier surface covered for its part with the actual sieve. This makes it possible to design the sieve surface economically since the function of mechanical stability and that of a sieve, namely, separating out particles of dirt, are separated from one another. In an especially advantageous further development of the invention the sieve consists of a microsieve covering [fabric] drawn over the carrier surface of the sieve surface. In another advantageous embodiment of the invention the sieve consists of a polyester cloth covering. A sintered, pre-tensioned microsieve without carrier surface can also be used.

In an economical embodiment the carrier surface consists of a perforated sheet, which simultaneously assures sufficient mechanical stability, an economical design and operational reliability. This sheet is formed in an especially advantageous manner from a corrosion-resisting material, e.g., stainless steel (high-grade steel). In an especially advantageous further development of the invention the sieve surface is associated with a wiper that can be, e.g., simply arranged stationarily. The dehydrated sludge is then separated in a simple manner from the sieve surface by the rotation of the sieve surface. The wiper can be advantageously provided with brushes or comprise a wiper lip designed, e.g., in an advantageous manner from rubber or some other suitable material, e.g., plastic.

In an especially advantageous further development of the invention the sieve surface comprises a cleaning device which brings it about in an advantageous manner that the sieve surface can not be clogged by the solid components of the sludge and that these solid components can be removed, thus increasing the operational reliability of the device. In an especially advantageous further development of the invention the cleaning device is designed as a spray-jet system, as a result of which a reliable operation is assured and as an advantage no additional measures or means have to be used. For the sake of simplicity the separated water can be used with advantage for the operation of the spray jets. The especially advantageous arrangement of the cleaning device, viewed in the direction of movement of the sieve surface after the wiper and thus in front of the sludge feed, brings it about that the sieve surface is cleaned before new sludge is applied onto it in order that the passage of the water and therewith a dehydration of the sludge is reliably assured. To this end the cleaning device is advantageously arranged below the sieve surface since this assures an especially good cleaning of the openings of the sieve surface.

In a further advantageous further development of the invention the sieve surface is provided with a pressing device advantageously designed as a roller. This device rests on the sludge in order to place it under pressure in this manner so that more water can be separated off. Due to the advantageous design as a roller it can be moved along with the moving sludge so that no delay or backup of the sludge takes place. The load that the roller exerts on the sludge can be designed in an advantageous manner to be adjustable in that, e.g., the roller is advantageously designed to be hollow in order that it can be filled, e.g., with water to increase its intrinsic weight. In a further advantageous embodiment of the invention grippers are provided that are stationarily arranged in such a manner that they engage into the sludge as a result of the rotation of the sieve surface and thoroughly mix it or loosen it up, as a result of which, e.g., trapped water that has already been separated is freed and can be separated. This rearrangement of the sludge therefore increases the amount of water separated off.

The invention is explained in detail in the following with reference made to the drawings.

Figure 1:
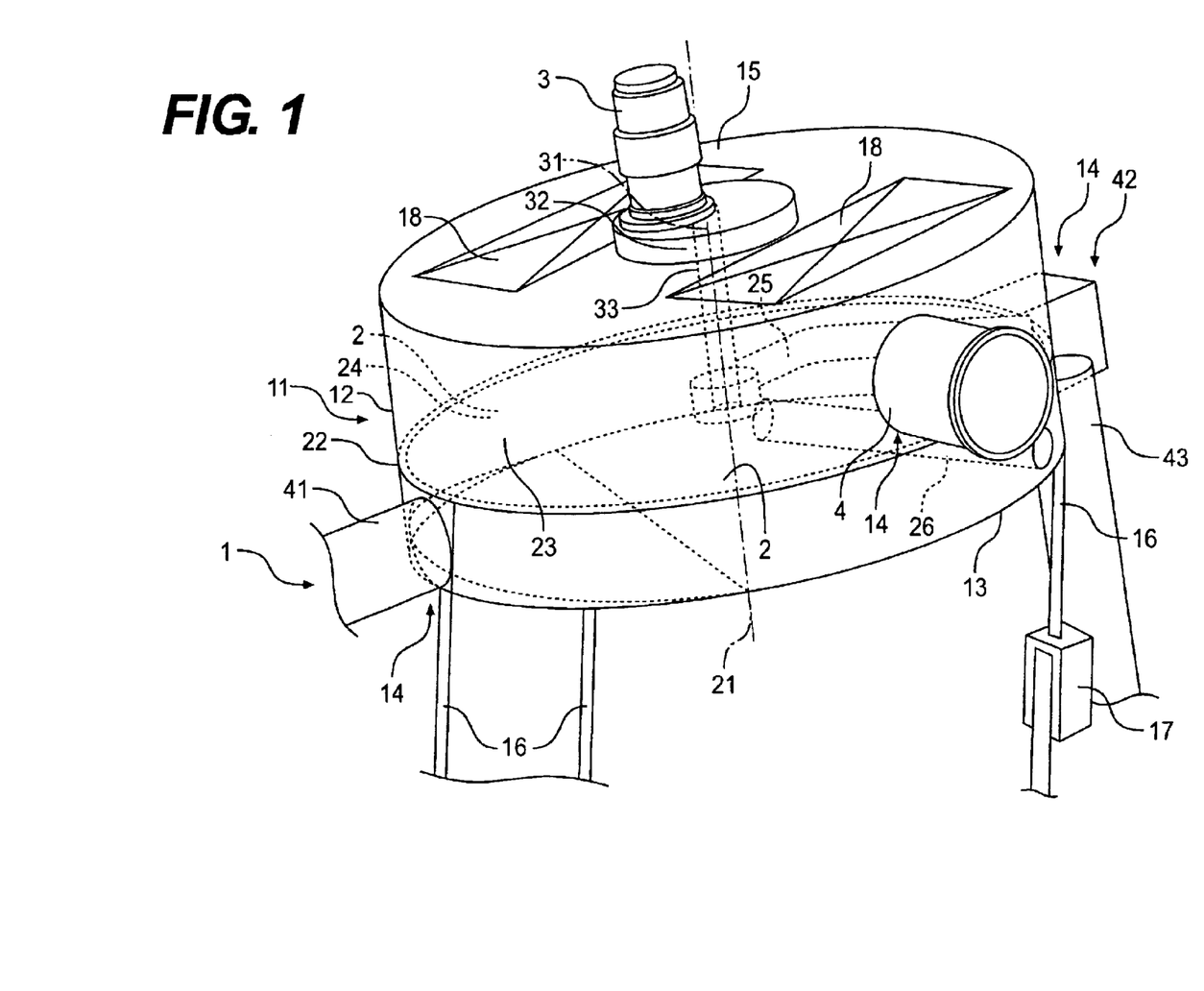
FIG. 1 shows a perspective, schematic view of the device in accordance with the invention.

FIG. 1 shows a schematic, perspective view of device 1 in accordance with the invention. Device 1 consists of container 11 with side wall 12 and cover 15 that closes container 11 off at the top. Device 1 is carried by supports 16 arranged on container 11. Container 11 comprises substantially three perforations 14 via which it is loaded with sludge and via which the separated water and the residual sludge are removed. Support 16 arranged opposite outlet 41 for separated water comprises adjustment device 17 with the aid of which the length of this support 16 can be varied. As a result thereof, entire device 1 is inclined in the direction of outlet 41 for separated water. Axis 21 is accordingly inclined relative to a horizontal line. In the embodiment of FIG. 1 three supports are attached to container 11 as a result of which device 1 can be reliably set up in spite of its adjustability. It can be advantageous if one or more of the supports are fastened to or connected to vibrators (not shown). It is also possible to put only the sieve in oscillation.

Sieve surface 2, that runs vertically to axis 21 and is circularly designed, is located in the interior of container 11. The inside diameter of container 11 is substantially equal to the outside diameter of circular sieve surface 2 so that sieve surface 2 divides the interior of container 11 into two areas, one above the place of sieve surface 2 and one below sieve surface 2. Sieve surface 2 consists of carrier surface 23 covered with sieve 24.

Sieve surface 2 is permanently connected to shaft 31 arranged in its center. Shaft 31 has the task of supporting sieve surface 2 and of causing it to rotate. To this end shaft 31 is fastened and rotatably mounted in the area of cover 15 and at the same time connected to drive device 3, with an electromotor in the exemplary embodiment of FIG. 1. This motor produces a rotary motion via transmission 32 that transmits the speed of the motor in a reduced manner to shaft 31. In case of need, shaft 31 can also be guided [run] through sieve surface 2 down to the bottom of container 13 where it can likewise be additionally guided and supported. Sieve surface 2 is sealed by a slot seal against the inner wall of container 11 in the area of edge 22. However, it is also just as possible to support or guide sieve surface 2 in the area of its edge 22 on the inner wall of container 11 (not shown in FIG. 1). It is also conceivable to drive the sieve surface in this area. Shaft 31 is surrounded by casing [bushing] 33 that does not rotate itself but rather forms a holder for wiper 25. Cover 15 has inspection openings 18 on its top.

The exemplary embodiment of the invention, the device of FIG. 1, operates as follows. Sludge conditioned with auxiliary flocculation agents is fed into container 11 of device 1 via supply line 4 designed substantially as a pipe piece connected to a line (not shown). Dilute sludge is treated as is known in the state of the art with these auxiliary flocculation agents in order to assure a better separation of water from the sludge. The conditioned dilute sludge is applied via supply line 4 onto the top side of sieve surface 2 where it settles on it. Sieve surface 2 is rotating, so that the sludge, if it does not flow off automatically [by itself], is transported out of the range of supply line 4. The direction of transport is determined by the direction of rotation of sieve surface 2, which executes a rotation to the right viewed from drive device 3. The sludge located between supply line 4 and casing 33 is therefore transported to outlet 41. As soon as the sludge has been applied onto sieve surface 2 a dehydration takes place since the water and/or the liquid in the sludge leaves the sieve surface downward under the influence of gravity through the openings of the microsieve covering and the openings (not visible) of the perforated sheet. At first, an increased amount of sludge can accumulate on sieve surface 2 in the area above outlet 41 for separated water as a consequence of the oblique position of device 1, which increased amount of sludge is entrained again due to the rotary motion of sieve surface 2 and settles in a layer on sieve surface 2 and is then transported by the latter in the direction of discharge 42 for the dehydrated sludge. Water that collected below sieve surface 2 in container 11 is removed from the sludge during the entire transport path of the sludge. The collected water is continuously removed from device 1 via outlet 41 and a pipeline (not shown).

Grippers can be provided in the transport path of the sludge from supply line 4 to the discharge of dehydrated sludge 42 which grippers engage in the sludge layer on sieve surface 2 and thoroughly mix and rearrange it as is known from the state of the art in order to improve the separation of the water from the sludge. As a result of this measure, water that has already been separated but has settled on the sludge surface can be mixed back under the sludge in order that the water can be removed through sieve surface 2. During its further transport the sludge passes into the range of wiper 25 running from the center of sieve surface 2 at least to its outer edge. Wiper 25 has a curved form whose outer side is loaded by the sludge being transported to it, as a result of which this sludge is guided along the outer side of the arc into the range of the edge of sieve surface 2. The dehydrated sludge conducted in this manner into the outside range of sieve surface 2 leaves container 11 via discharge 42, that begins at a perforation 14 of container 11. The dehydrated sludge is thus removed from the surface of sieve surface 2 by wiper 25, conducted to discharge 42 for dehydrated sludge and conducted out of device 41 via pipeline 43. A thickened-sludge feed pump (not shown) that transports the sludge further can be connected to pipeline 43.

Cleaning device 26 is arranged between wiper 25 and supply line 4 for sludge which cleaning device cleans sieve surface 2 and its sieve, e.g., the microsieve covering again in order that their ability to separate liquid out of the sludge is not limited by contamination. Cleaning device 26 is designed as a spray-jet system that sprays sieve surface 2 from below with water in order to wash contaminants out of the sieve. Cleaning device 26 extends radially from shaft 31 to the wall of container 11 so that the entire working width of the sieve surface is cleaned before the application of new sludge via supply line 4. The spray-jet system of cleaning device 26 can be operated with fresh water; however, it is favorable if it is operated with the separated water from device 1. To this end the latter water is delivered to the cleaning device with a pump (not shown). The cleaning of sieve surface 2 can take place continuously or discontinuously as a function of the requirements and contaminations of the sieve of sieve surface 2.

In a further advantageous embodiment device 1 can also be provided with a roller or a loading device designed in some other manner that contacts or loads the sludge before it reaches wiper 25 in order to achieve a dehydration gained by virtue of pressure in addition to the static dehydration. Such a roller (not shown) extends radially outward from the area of the midpoint of sieve surface 2 approximately to the wall of container 11. The roller is rotatably supported so that it is caused to rotate by the sludge contacting it. This brings it about that the sludge does not back up on the roller but rather is passed through between the roller and sieve surface 2. The contact pressure force of the roller is variably adjustable, e.g., by increasing the intrinsic weight of the roller, in order to load the sludge with a differing force as required. In order to prevent relative movements between sludge and roller that are too great the roller can also be subdivided along its axis of rotation into different sections that can rotate independently of each other in order to equalize the circumferential speed of the roller with the transport speed of the transported sludge. The roller surface can be designed simply in the form of a cylindrical surface or also of a conical surface on account of its better rolling conditions. The surface can also be provided with pins or grooves to penetrate deeper into the sludge.

Figure 2:
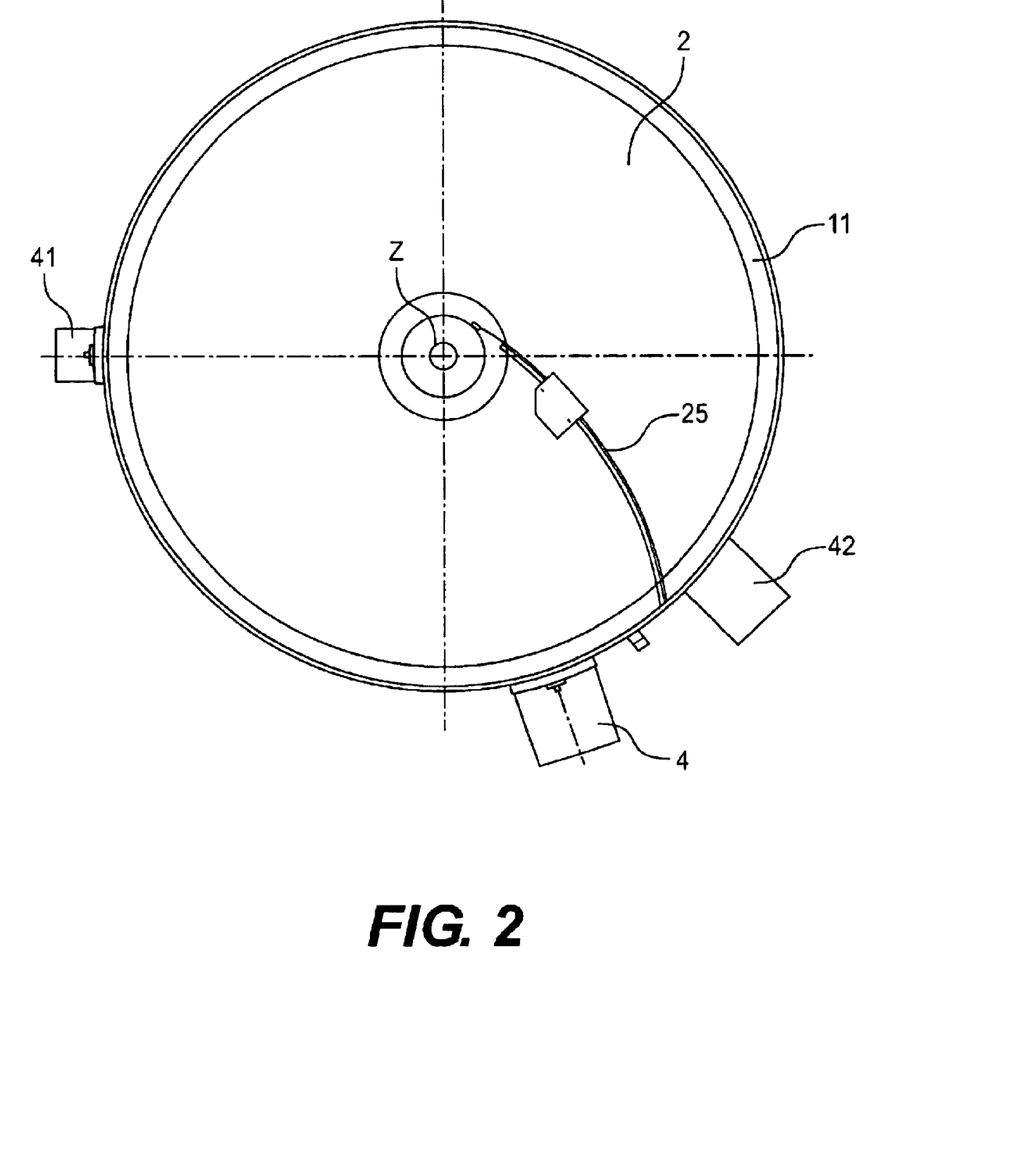
FIG. 2 shows a top view of the device of FIG. 1 in which the section directly below the cover is parallel to the latter.

The top view of FIG. 2 shows sieve surface 2 above which the wiper 25 is arranged. Sieve surface 2 entrains the sludge fed via the supply line during its clockwise rotation and guides it up to wiper 25 where the dehydrated sludge leaves sieve surface 2 again via discharge 42. Cleaning device 26 (see figure a) is not shown in FIG. 2. Wiper 25 begins in the area of center Z and extends in an arc to the wall of container 11. As a result of the rotary movement of the sieve surface the dehydrated sludge is guided along wiper 25 from center Z in the direction of the wall of container 11 which container it leaves again via discharge 42.

Figure 3A:
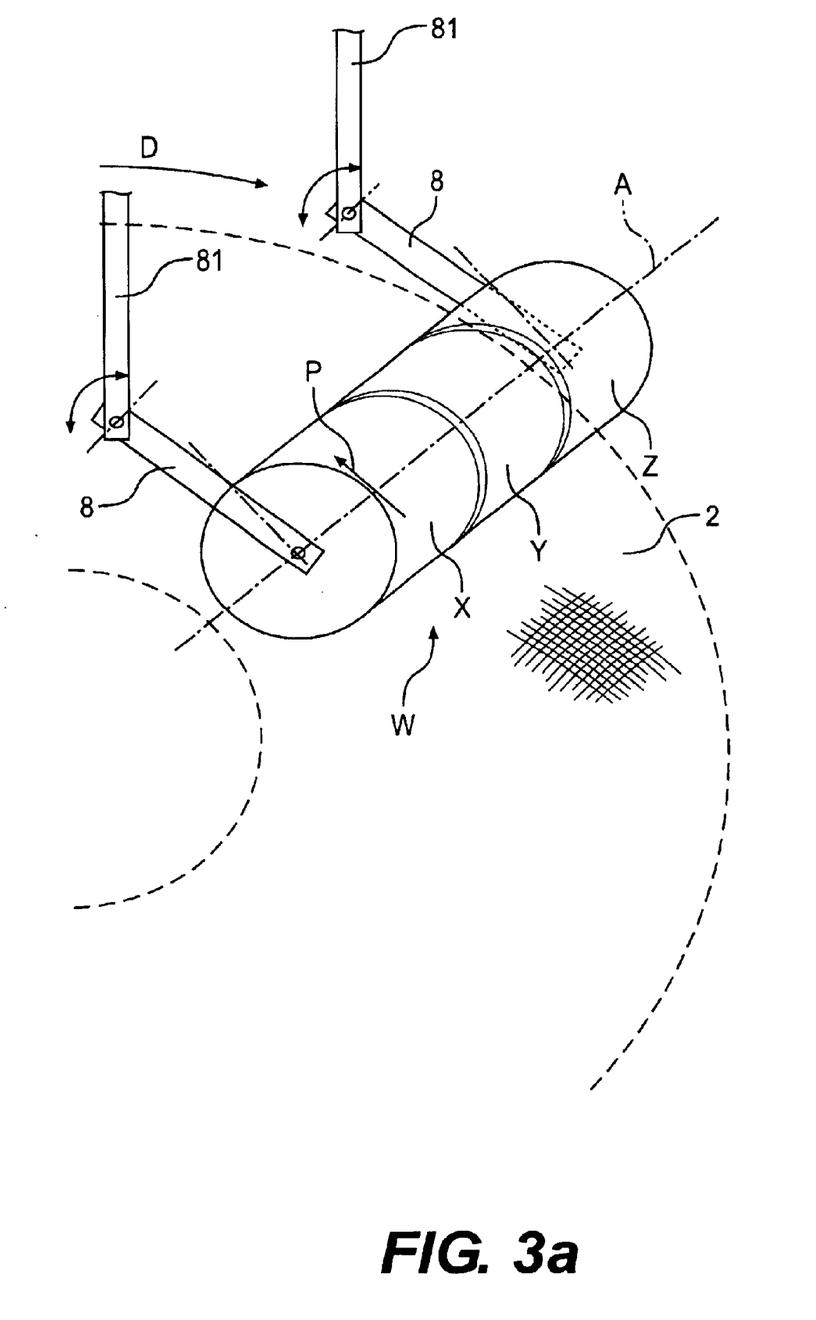
FIGS. 3a–3c show views of the roller.

FIG. 3a schematically shows roller W that rests with its intrinsic weight on the sludge lying of sieve surface 2 or that can be pressed onto this sludge with auxiliary means. Roller W is caused to rotate by the rotation of sieve surface 2 and the sludge transported by sieve surface 2. The roller itself comprises several individual sections X, Y and Z in an axial direction in order to compensate the different circumferential speeds of sieve surface 2. The individual sections X, Y and Z are sealed off from each other by seals that have a very low surface adhesion. Direction of rotation D of sieve surface 2 causes individual sections X, Y, Z of roller W to rotate about axis A in the direction of arrow P at different speeds. The pressure of roller W on the sludge improves its dehydration. Roller W is pivotably held via holders 8 to rods 81 fastened on the cover of the device.

Figure 3B:
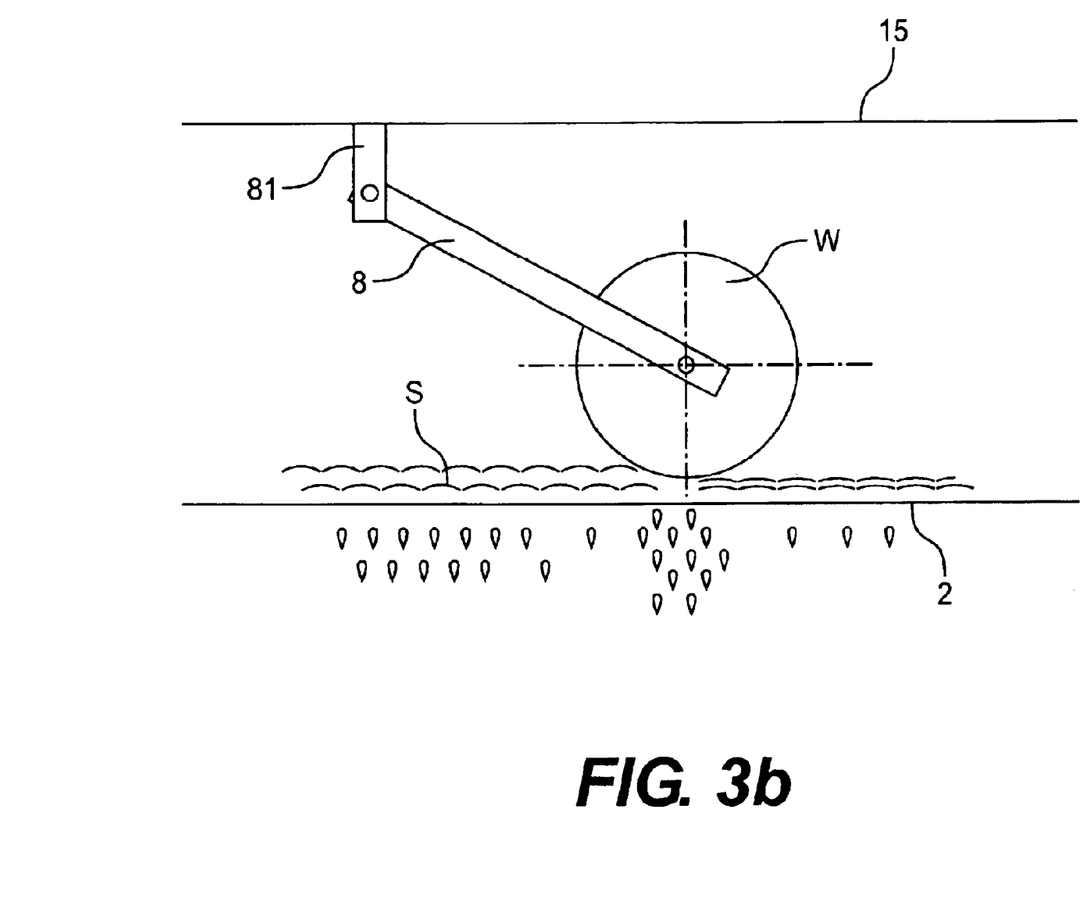

FIG. 3b schematically shows the resting of roller W on sieve surface 2 in section. Rods 81 that pivotably mount holders 8 are fastened to cover 15. The resting of roller W on sludge S increases the separation of liquid in the area where the roller rests, which liquid drops through sieve surface 2.

Figure 3C:
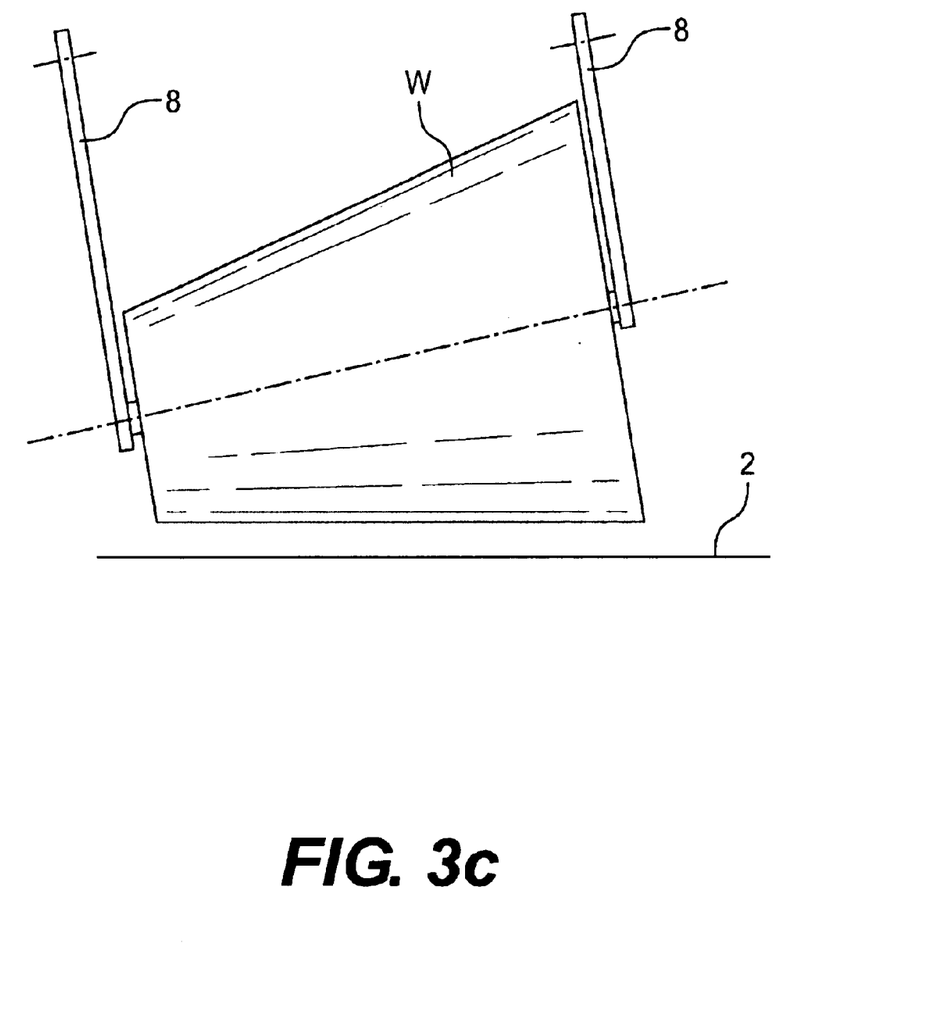

FIG. 3c schematically shows a conical roller W that is designed in one piece on account of this design since the circumferential speeds at the various diameters of the roller are adapted to the circumferential speeds of sieve surface 2. The axis of rotation of the roller is correspondingly inclined to the surface of sieve surface 2. In a corresponding manner, as is shown in FIG. 3b, roller W is held via holders 8 and rods 81 (not shown).

Figure 4:
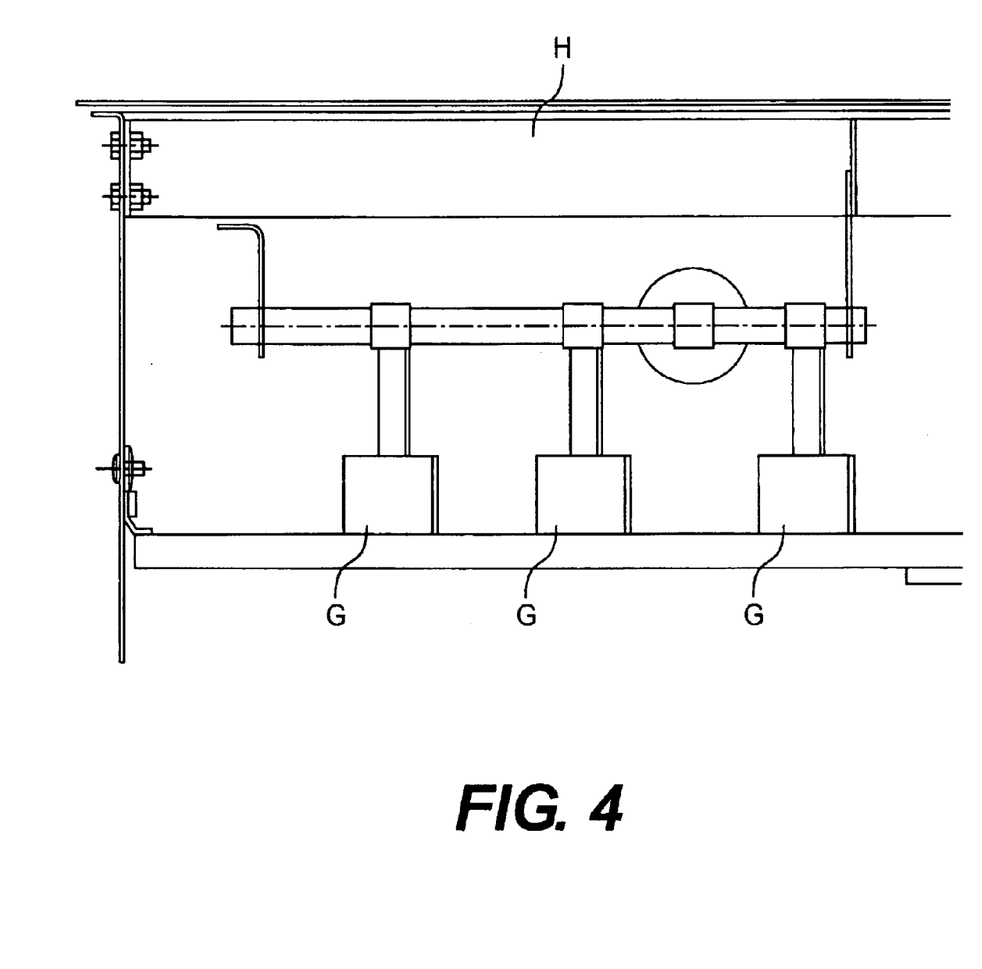
FIG. 4 shows grippers that engage into the sludge.

FIG. 4 shows grippers G that engage into the sludge. They are arranged on holder H that holds them stationarily in the device while the sludge is guided past them. The grippers act thereby on the sludge in a manner similar to a harrow for working the soil.

That which is claimed:

1. An apparatus for dehydrating sludge from a sewage treatment plant comprising:
    a substantially circular sieve adapted for receiving a supply of sludge, said sieve defining a sieve surface having a plurality of openings, said sieve further defining a shaft extending from said sieve surface, said sieve inclined relative to a horizontal reference line.

2. The apparatus according to claim 1 wherein the apparatus further comprises a container having at least one sidewall and a bottom, said sieve operatively disposed within said container.

3. The apparatus according to claim 2 wherein said container further comprises a supply line for providing a source of sludge, a first outlet for removal of separated water, and a second outlet for removal of dehydrated sludge.

4. The apparatus to claim 3 wherein the supply line for sludge is positioned above the sieve surface and the first outlet for separated water is positioned below the sieve surface.

5. The apparatus according to claim 3 wherein said supply line, said first outlet, and said second outlet are positioned opposite one side of said sieve surface.

6. The apparatus according to claim 2 wherein said container further comprises a plurality of perforations for the passage of materials therethrough.

7. The apparatus according to claim 1 wherein said sieve surface is rotatably supported along an edge of said sieve.

8. The apparatus according to claim 7 wherein at least one of said shaft and said drive mechanism is mounted above said cover.

9. The apparatus according to claim 2 wherein said container is adjustable so as to vary an inclination of said sieve surface relative to a horizontal reference line.

10. The apparatus according to claim 2 wherein a plurality of supports operatively engage said container, at least one of said supports adapted for varying length so as to vary an inclination of said sieve surface relative to a reference horizontal line.

11. The apparatus according to claim 10 wherein said at least one support may be adjusted along its length to between 0° and 30° in reference to a vertical line.

12. The apparatus according to claim 2 wherein said apparatus further comprises a plurality of grippers which are positioned above said sieve surface, said grippers adapted for mixing and loosening sludge as said sludge is moved.

13. The apparatus according to claim 1 wherein the sieve further comprises a carrier surface covered with a sieve material.

14. The apparatus according to claim 13 wherein said sieve surface is provided by a material selected from the group consisting of a microsieve, a polyester cloth, a wire screen, and combinations thereof.

15. The apparatus according to claim 13 wherein said carrier surface is a perforated sheet.

16. The apparatus according to claim 15 wherein the perforated sheet is provided from a corrosion-resistant material.

17. The apparatus according to claim 1 wherein said sieve surface is in operative engagement with a wiper for removing a dehydrated sludge from said sieve surface.

18. The apparatus according to claim 17 wherein said wiper further comprises a brush.

19. The apparatus according to claim 17 wherein said wiper further comprises a sludge engaging surface of a rubber or plastic.

20. The apparatus according to claim 1 wherein said apparatus further comprises a cleaning apparatus adapted for cleaning said sieve surface.

21. The apparatus according to claim 20 wherein said cleaning apparatus is a fluid spray jet.

22. The apparatus according to claim 20 wherein said cleaning apparatus, viewed in a direction of movement of the sieve surface to be cleaned, is positioned in front of said sludge feed.

23. The apparatus according to claim 20 wherein said cleaning apparatus is positioned below said sieve surface.

24. The apparatus according to claim 1 further comprises a roller adapted for operatively engaging sludge carried on said sieve surface.

25. The apparatus according to claim 24 wherein a pressure exerted by said roller may be adjusted.

26. The apparatus according to claim 1 wherein said apparatus further comprises a drive mechanism for rotating said sieve surface.

27. The apparatus according to claim 26 wherein said drive mechanism operatively engages said shaft.

28. The apparatus according to claim 26 wherein said container further comprises a cover.

29. An apparatus for de-watering sludge comprising:
    a container having at least one sidewall and a bottom;
    a sieve rotatively positioned within said container, said sieve defining a shaft extending from a vertical axis defined by said sieve;
    a drive mechanism operatively engaging said shaft;
    a sludge inlet defined by said container, said inlet positioned above an upper sieve surface;
    a first outlet defined by said container, said first outlet adapted for removing fluids passing through said sieve;
    a second outlet defined by said container, said second outlet adapted for removing de-watered sludge from said upper surface of said sieve;
    a roller, suspended above said upper sieve surface, said roller adapted for engaging sludge supported on said sieve; and
    a wiper, said wiper positioned above said upper sieve surface and directing de-watered sludge from said sieve surface to said second outlet.

\* \* \* \* \*